(12) United States Patent
Shimahara

(10) Patent No.: US 11,920,619 B2
(45) Date of Patent: *Mar. 5, 2024

(54) EXPANSION ANCHOR WITH FORWARDS AND REARWARDS GROOVES

(71) Applicant: Hilti Aktiengesellschaft, Schaan (LI)

(72) Inventor: Hideki Shimahara, Grabs (CH)

(73) Assignee: Hilti Aktiengesellschaft, Schaan (LI)

( * ) Notice: Subject to any disclaimer, the term of this patent is extended or adjusted under 35 U.S.C. 154(b) by 521 days.

This patent is subject to a terminal disclaimer.

(21) Appl. No.: 17/273,408

(22) PCT Filed: Oct. 7, 2019

(86) PCT No.: PCT/EP2019/077050
§ 371 (c)(1),
(2) Date: Mar. 4, 2021

(87) PCT Pub. No.: WO2020/074426
PCT Pub. Date: Apr. 16, 2020

(65) Prior Publication Data
US 2021/0332841 A1    Oct. 28, 2021

(30) Foreign Application Priority Data
Oct. 9, 2018 (EP) .................................. 18199323

(51) Int. Cl.
*F16B 13/06* (2006.01)
(52) U.S. Cl.
CPC .................................. *F16B 13/065* (2013.01)
(58) Field of Classification Search
CPC ... F16B 13/065; F16B 13/066; F16B 19/1045
(Continued)

(56) References Cited

U.S. PATENT DOCUMENTS

| 4,223,587 A | 9/1980 | Deutschenbaur et al. |
| 4,886,406 A | 12/1989 | Herb |

(Continued)

FOREIGN PATENT DOCUMENTS

| CN | 102032252 A | 4/2011 |
| CN | 102859208 A | 1/2013 |

(Continued)

OTHER PUBLICATIONS

Shihui Wang et al.: Basics of mechanical design, 1st Edition, Feb. 28, 2005, p. 149-150, see English translation.

(Continued)

*Primary Examiner* — Victor D Batson
*Assistant Examiner* — Dil K. Magar
(74) *Attorney, Agent, or Firm* — Davidson, Davidson & Kappel, LCC

(57) ABSTRACT

An expansion anchor including an anchor bolt, and at least one expansion shell located at the anchor bolt, wherein the anchor bolt includes a wedge zone for expanding the at least one expansion shell, a neck zone accommodating at least parts of the expansion shell, the neck zone being located rearwardly of the wedge zone, an abutment zone forming a rearward stop for the expansion shell, the abutment zone being located rearwardly of the neck zone, and a rear zone for intruding tensile force into the anchor bolt, the rear zone being located rearwardly of the abutment zone, wherein the anchor bolt is provided with at least one forwards groove, located in front of the abutment zone. The anchor bolt is provided with an aligned rearwards groove, which is aligned with the at least one forwards groove, and which is located rearwardly of the abutment zone.

9 Claims, 2 Drawing Sheets

(58) Field of Classification Search
USPC ............. 411/44, 49, 50, 51, 57.1, 60.1
See application file for complete search history.

(56) References Cited

U.S. PATENT DOCUMENTS

| | | | |
|---|---|---|---|
| 5,211,512 A * | 5/1993 | Frischmann | F16B 13/065 |
| | | | 411/33 |
| 6,027,292 A | 2/2000 | Raber et al. | |
| 9,765,804 B2 * | 9/2017 | Schaeffer | F16B 13/065 |
| 10,202,999 B2 | 2/2019 | Steinberg et al. | |
| 10,781,842 B2 | 9/2020 | Schaeffer et al. | |
| 10,823,216 B2 | 11/2020 | Shimahara et al. | |
| 2004/0096288 A1 | 5/2004 | Haug et al. | |
| 2007/0172328 A1 * | 7/2007 | Houck | F16B 13/0858 |
| | | | 411/60.2 |
| 2011/0081217 A1 | 4/2011 | Wissling et al. | |
| 2014/0010613 A1 * | 1/2014 | Gaudron | F16B 13/065 |
| | | | 411/44 |
| 2014/0133933 A1 | 5/2014 | Shimahara et al. | |
| 2015/0167715 A1 | 6/2015 | Hakenholt et al. | |
| 2016/0238051 A1 * | 8/2016 | Schaeffer | F16B 13/065 |
| 2016/0238052 A1 * | 8/2016 | Schaeffer | F16B 13/065 |
| 2016/0298667 A1 * | 10/2016 | Gstach | F16B 13/06 |
| 2017/0343026 A1 * | 11/2017 | Schaeffer | F16B 13/066 |
| 2018/0209461 A1 | 7/2018 | Walz et al. | |

FOREIGN PATENT DOCUMENTS

| | | | | | |
|---|---|---|---|---|---|
| CN | 102954079 A | | 3/2013 | | |
| CN | 102966650 A | | 3/2013 | | |
| CN | 104040192 A | * | 9/2014 | ............ | E21B 23/00 |
| CN | 104040192 A | | 9/2014 | | |
| CN | 204003871 U | | 12/2014 | | |
| CN | 105508366 A | | 4/2016 | | |
| CN | 105556138 A | | 5/2016 | | |
| CN | 205401346 U | | 7/2016 | | |
| CN | 105864252 A | * | 8/2016 | ............ | F16B 13/068 |
| CN | 106514136 A | | 3/2017 | | |
| CN | 206017363 U | * | 3/2017 | ............ | F16B 13/06 |
| CN | 206017363 U | | 3/2017 | | |
| CN | 206468637 U | | 9/2017 | | |
| CN | 108474400 | | 8/2018 | | |
| CN | 108474400 A | * | 8/2018 | ............ | F16B 13/065 |
| CN | 209604009 U | | 11/2019 | | |
| DE | 2256822 A1 | | 6/1974 | | |
| DE | 2808446 A1 | | 8/1979 | | |
| DE | 3411285 A1 | | 10/1985 | | |
| DE | 19709567 A1 | | 9/1998 | | |
| DE | 10118374 A1 | | 10/2002 | | |
| DE | 202004019778 U1 | | 3/2005 | | |
| DE | 102006031467 A1 | | 1/2008 | | |
| DE | 102009044559 A1 | | 5/2011 | | |
| DE | 202015105030 U1 | * | 11/2015 | ............ | F16B 12/20 |
| EP | 0515916 A2 | | 12/1992 | | |
| EP | 2848825 A1 | | 3/2015 | | |
| KR | 20180065019 A | | 6/2018 | | |
| WO | WO 8606447 A2 | | 11/1986 | | |
| WO | WO 2008003456 | | 1/2008 | | |
| WO | WO 2017067945 A1 | | 4/2017 | | |
| WO | WO2020074423 A1 | | 4/2020 | | |
| WO | WO2020074424 A1 | | 4/2020 | | |

OTHER PUBLICATIONS

International Search Report of PCT/EP2019/077050, dated Nov. 12, 2019.

* cited by examiner

EXPANSION ANCHOR WITH FORWARDS AND REARWARDS GROOVES

The invention relates to an expansion anchor. Such an expansion anchor comprises an anchor bolt, and at least one expansion shell located at the anchor bolt, wherein the anchor bolt comprises a wedge zone for expanding the at least one expansion shell, a neck zone accommodating at least parts of the expansion shell, the neck zone being located rearwardly of the wedge zone, an abutment zone forming a rearward stop for the expansion shell, the abutment zone being located rearwardly of the neck zone, and a rear zone for intruding tensile force into the anchor bolt, the rear zone being located rearwardly of the abutment zone, wherein the anchor bolt is provided with at least one forwards groove, located in front of the abutment zone.

BACKGROUND

EP2848825 A1 discloses an expansion anchor. In case of EP2848825 A1, the expansion sleeve has at least one web on its inner side, which web engages a groove provided in the neck zone of the anchor bolt. During installation, the web is displaced radially outwardly by the wedge zone of the anchor bolt, i.e. the material of the web is activated, to yield particularly wide expansion.

DE2256822 A1 shows an expansion anchor in which a rotational lock is provided between the expansion sleeve and the anchor bolt. This rotational lock might be formed by a groove located in the neck zone of the anchor bolt, and a corresponding protrusion, which protrudes from the expansion sleeve.

EP0515916 A2 and DE3411285 A1 describe fasteners. In both cases, sleeves interlock with inner bolts via toothings.

WO17067945 A1 describes a method for anchoring an expansion anchor in a hole, in which the expansion anchor is first expanded and the space between the wall of the hole and the anchor bolt is then filled with a hardenable mass, such that the hardenable mass reaches the abutment zone of the anchor bolt.

SUMMARY OF THE INVENTION

It is an object of the invention to provide an expansion anchor which, whilst providing good and reliable performance, can be manufactured particularly easily and at particularly low expense and effort, and which can also provide added functionality.

The present invention provides an expansion anchor comprising
  an anchor bolt (10), and
  at least one expansion shell (30) located at the anchor bolt (10),
  wherein the anchor bolt (10) comprises
    a wedge zone (12) for expanding the at least one expansion shell (30),
    a neck zone (13) accommodating at least parts of the expansion shell (30), the neck zone (13) being located rearwardly of the wedge zone (12),
    an abutment zone (14) forming a rearward stop for the expansion shell (30), the abutment zone (14) being located rearwardly of the neck zone (13), and
    a rear zone (17) for intruding tensile force into the anchor bolt (10), the rear zone (17) being located rearwardly of the abutment zone (14),
    wherein the anchor bolt (10) is provided with at least one forwards groove, located in front of the abutment zone (14),
  characterized in that
    the anchor bolt (10) is provided with at least one aligned rearwards groove, which is aligned with the at least one forwards groove, and which is located rearwardly of the abutment zone.

According to the invention, the anchor bolt is provided with at least one aligned rearwards groove, which is aligned with the at least one forwards groove, an which is located rearwardly of the abutment zone.

Thus, the invention proposes to provide a structure rearwardly of the abutment zone which is axially aligned with the forwards groove.

The at least one forwards groove provided immediately in front of the abutment zone or with some distance in front of the abutment zone can functionally interact with the adjacent expansion shell, for example to provide a rotational interlock, to accommodate expansion shell material that is to be radially displaced by the wedge zone when the anchor is loaded, or to zonally load the expansion shell. The invention has found that it can be advantageous to provide, rearwardly of the abutment zone, an additional groove, namely the aligned rearwards groove, which corresponds to the forwards groove and which is aligned, in particular axially aligned, with the forwards groove. Firstly, this additional groove allows to reduce the quantity of required material when manufacturing the anchor. Moreover, the resulting anchor bolt design can be particularly symmetric, which can, due to the resulting force distribution, be favourable from a manufacturing point of view, in particular when cross wedge rolling is employed.

The forwards groove and the corresponding aligned rearwards groove are aligned. In other words, the aligned rearwards groove lies in a virtual straight extension of the forwards groove. More preferably, there is no circumferential offset between the forwards groove and the corresponding aligned rearwards groove. This can further improve symmetry of force and facilitate manufacturing.

The anchor bolt is an elongate body. The expansion shell is located adjacent to the anchor bolt, so that it can be, for the purpose of anchoring the expansion anchor, radially displaced when the anchor bolt is loaded in the rearwards direction.

Preferably, the wedge zone, the neck zone, the abutment zone, if present an intermediate zone and a bulged zone, and the rear zone of the anchor bolt are integral, which can ease manufacturing and improve performance. The wedge zone, the neck zone, the abutment zone, if present an intermediate zone and a bulged zone, and the rear zone are non-overlapping, i.e. separate, in the axial direction. In particular, the wedge zone is adjacent to the neck zone, the neck zone is adjacent to the abutment zone, the abutment zone is adjacent to the intermediate zone, the intermediate zone is adjacent to the bulged zone and/or the bulged zone is adjacent to the rear zone.

The anchor bolt defines a longitudinal axis, which advantageously can also be the longitudinal axis of the expansion anchor. Following the usual definition, the longitudinal axis can in particular be that axis that runs in the longitudinal direction, i.e. in the long direction of the anchor bolt. Where the terms "radially", "axially", "longitudinally", "circumferentially", "forwards", "rearwards", "back", and so forth are used, this should in particular be understood with respect to the longitudinal axis of the anchor bolt.

In the wedge zone, the anchor bolt forms a wedge for the expansion shell, which wedge converges towards the rear of the anchor bolt, so that the wedge zone can radially displace the expansion shell when the anchor bolt is loaded in the rearwards direction. For example, the anchor bolt can be conical in the wedge zone. However, more complex converging designs, including, for example, the forwards groove extending into the wedge zone, can be particularly preferred.

The neck zone is located axially between the wedge zone and the abutment zone. At least a part of the expansion shell, preferably a significant part of the expansion shell, axially overlaps the neck zone, at least before installation of the expansion anchor. Thus, the neck zone at least partly accommodates the expansion shell. In the neck zone, the anchor bolt is preferably cylindrical, in particular cylindrical with a non-circular base, with the non-circularity being caused, at least amongst others, by the forwards groove.

In the abutment zone, the anchor bolt has a shape that blocks a rearward movement of the expansion shell relative to the anchor bolt. Thus, the abutment zone can advance the expansion shell into a hole when the anchor bolt is inserted into a hole. In particular, the anchor bolt can have greater maximum diameter and/or maximum radius in the abutment zone when compared to the neck zone and preferably also when compared to the intermediate zone.

The rear zone is for introducing rearwardly directed tensile forces into the anchor bolt, i.e. for loading the anchor. Preferably, the anchor bolt is threaded, in particular threaded throughout, in the rear zone, wherein the thread allows force transmission. Thus, the rear zone is preferably a thread zone, in particular an outer thread zone. However, in an alternative embodiment, the anchor bolt can also have a larger-diameter head in the rear zone, which is particularly preferred for low load applications.

In particular, the thread of the rear zone does not extend into the intermediate zone, i.e. the thread of the rear zone is remote from the intermediate zone. In particular, the intermediate zone and/or the neck zone are threadless.

Preferably, the anchor bolt and/or the expansion shell are steel parts each. They can for example comprise carbon steel or stainless steel.

Preferably, both the at least one forwards groove and the at least one aligned rearwards groove run in the longitudinal direction. Thus, said grooves run in particular parallel to the longitudinal axis of the anchor bolt. In particular, the long axes of said grooves extend parallel to the longitudinal axis of the anchor bolt and/or said grooves do not form a thread. The neck zone is preferably unthreaded. Preferably, the flanks of said grooves run parallel to the longitudinal axis of the anchor bolt. Said grooves are provided on the lateral surface of the anchor bolt, i.e. they form a depression in the lateral surface of the anchor bolt. In particular, said grooves have a long extension each, and these long extensions runs longitudinally, i.e. parallel to the longitudinal axis. A groove can be understood to be a long narrow depression, in particular a bottomed depression.

According to a preferred embodiment, the anchor bolt comprises an intermediate zone, the intermediate zone being located rearwardly of the abutment zone, and the rear zone being located rearwardly of the intermediate zone, and the at least one forwards groove is a neck zone groove located within the neck zone and the at least one aligned rearwards groove is an intermediate zone groove located within the intermediate zone. According to this embodiment, the forwards groove is located in the anchor neck, where the forwards groove can e.g. serve as a rotational interlock with the expansion shell or to take up expandable expansion shell material. The corresponding aligned rearwards groove is located in an intermediate zone, which corresponds to the neck zone, and which is, in particular, located between the abutment zone and the rear zone. The intermediate zone can be adjacent to the rear zone, or there can also be a bulged zone or another zone between the intermediate zone and the rear zone. The intermediate zone connects the abutment zone with the rear zone, i.e. it is located between the abutment zone and the rear zone. In the intermediate zone, the anchor bolt is preferably cylindrical, in particular cylindrical with a non-circular base, with the non-circularity being caused, at least amongst others, by the intermediate zone groove. The expansion shell can preferentially be axially spaced from the intermediate zone.

According to another preferred embodiment, located between the abutment zone and the rear zone, and spaced from the abutment zone, the anchor bolt comprises a bulged zone, which radially protrudes on the anchor bolt, and the at least one forwards groove is a wedge zone channel located within the wedge zone and the at least one aligned rearwards groove is a bulged zone channel located within the bulged zone. According to this embodiment, the forwards groove is located in the wedge zone, where it can e.g. contribute to a discontinuous loading of the expansion shell and/or can support radial compression of the anchor bolt at its front end, thereby easing anchor installation. The aligned rearwards groove is located in a bulge zone that corresponds to the wedge zone.

The bulged zone is spaced from the abutment zone, i.e. the bulged zone and the abutment zone are arranged a distance apart. The bulged zone is in an axial position located between the abutment zone and the rear zone, and has some distance from the abutment zone. The bulged zone can serve to directly transfer lateral loads into the surrounding hole wall, thereby improving anchor performance. Bulged zone channels can support radial compression of the bulged zone, thereby easing anchor installation. Moreover, bulged zone channels can allow fluid passage, for example passage of a hardenable mass, axially past the bulged zone. If the anchor bolt has a transition zone and/or a tip zone located in front of the wedge zone, the wedge zone channel can also extend into at least one or both of these additional zones.

Preferably, the anchor bolt is provided with a plurality of forwards grooves, each being located in front of the abutment zone, and at least some, more preferably all, of the plurality of forwards grooves have a corresponding aligned rearwards groove provided on the anchor bolt, located rearwardly of the abutment zone, and aligned with the respective one of the plurality of forwards grooves. Thus, there are several corresponding forwards groove/rearwards groove pairs on the anchor bolt. If there is a plurality of forwards grooves, they can be exclusively neck zone grooves, exclusively wedge zone grooves or there can be a mixed configuration in which one or more of the forwards grooves are neck zone grooves and one or more of the forwards grooves are wedge zone grooves.

It is particularly advantageous if the at least one neck zone groove spans the entire neck zone and/or the at least one intermediate zone groove spans the entire intermediate zone. This can further reduce material requirement and improve functionality. In particular, the at least one neck zone groove can extend into the wedge zone and the at least one intermediate zone groove can extend into the bulged zone.

Preferably, the intermediate zone has greater length than the abutment zone and/or the neck zone has greater length than the abutment zone, which can further ease manufacturing and/or improve performance. Accordingly, the at least one intermediate zone groove has preferably greater length than the abutment zone and/or the at least one neck zone groove has preferably greater length than the abutment zone. It is particular advantageous if the at least one intermediate zone groove and the at least one neck zone groove have the same length. In particular, length can be considered to be the longitudinal extension.

The intermediate zone is preferably at least twice as long, in the axial direction, as the abutment zone, more preferably at least three times as long. It is particularly useful if the neck zone and the intermediate zone have same length. This can further increase symmetry, and the higher symmetry can further improve the manufacturing process and performance, due to the resulting symmetry of force during manufacturing and operation.

Advantageously, the intermediate zone and the neck zone have the same minimum radius r and/or the same maximum radius r. Alternatively or additional, it is preferred that the intermediate zone and the neck zone have the same minimum diameter d and/or the same maximum diameter d. Both allows to further reduce material requirement.

According to another preferred embodiment of the invention, the intermediate zone and the neck zone are, at least regionally, mirror symmetric, in particular with respect to a plane of symmetry that is perpendicular to the longitudinal axis and/or that traverses the intermediate zone. Such a highly symmetric setup can further improve the manufacturing process and performance, due to the resulting symmetry of force during manufacturing and operation, and reduce the quantity of required material. The two zones can be only regionally mirror symmetric, which implies that they can have regions that are mirror symmetric and other regions which are not. Preferably, the two zones are mirror symmetric at least in axially and circumferentially extending regions. It is also possible that the entire zones are mirror symmetric.

It is preferred that the at least one expansion shell engages into the at least neck zone groove. With such an arrangement, the neck zone groove can contribute to anchoring functionality, for example by accommodating material to be expanded or by contributing to a rotational lock.

The intermediate zone is preferably threadless. The bulged zone radially protrudes on the anchor bolt, i.e. the bulged zone juts out in the radial direction when compared to its surroundings, in particular when compared to the intermediate zone and/or at least a forward region of the rear zone. In particular, the bulged zone can form a ring surrounding the longitudinal axis of the anchor bolt.

The intermediate zone can connect the abutment zone with the bulged zone and with the rear zone, i.e. it is located between the abutment zone and the bulged zone and located between the abutment zone and the rear zone.

In particular, the thread of the rear zone does not extend into the bulged zone, i.e. the thread of the rear zone is remote from the bulged zone. In particular, the intermediate zone, the bulged zone and/or the neck zone are threadless.

In the bulged zone, the anchor bolt has preferably larger maximum radius, and more preferably also larger maximum diameter, than in the rear zone and/or in the intermediate zone.

According to a particularly advantageous embodiment, in the bulged zone, the anchor bolt has preferably larger maximum radius r, and more preferably also larger maximum diameter d, than in the abutment zone. This can concentrate the effect of the bulged zone on the bulged zone and can facilitate installation.

According to another advantageous embodiment, in the bulged zone, the anchor bolt has larger maximum radius r, and more preferably also larger maximum diameter d, than in the wedge zone. This can further can facilitate installation and/or give a particular reliable expansion of the expansion shell.

In all cases, maximum radius r and maximum diameter d can, in particular, relate to radii originating from the longitudinal axis or diameters crossing the longitudinal axis, respectively.

Advantageously, spacing between the abutment zone and the bulged zone is at least the length (i.e. the longitudinal extension) of the abutment zone.

Preferably, the distance of a least parts of the bulged zone from the abutment zone equals the distance of a least parts of the wedge zone from the abutment zone. In other words, a mirror image of the wedge zone generated by a mirror plane traversing the abutment zone perpendicular to the longitudinal axis at least partly overlaps the bulged zone in the axial direction. This high symmetry with respect to the abutment zone can further ease manufacturing, in particular if cross wedge rolling is employed.

In the abutment zone, the anchor bolt preferably comprises an abutment ring, which radially protrudes on the anchor bolt, in particular with respect to both the neck zone and the intermediate zone. This abutment ring can form a forwardly-facing ring shoulder, which allows particularly efficient expansion shell engagement whilst being easy to manufacture in the inventive setup. The abutment ring surrounds the longitudinal axis of the anchor bolt. It protrudes on the anchor bolt in the radial direction, i.e. it juts out over its surroundings in the radial direction, in particular it juts out over the neck zone and the intermediate zone in the radial direction. The bulged zone and/or the rear zone is spaced from the abutment ring, in particular via the intermediate zone. In particular, the abutment ring can define the length, i.e. the longitudinal extension, of the abutment zone, i.e. the length of the abutment zone equals the length of the abutment ring. Preferably, the abutment ring is the abutment zone.

Expediently, the expansion shell is an expansion sleeve surrounding the anchor bolt. This is particularly efficient and easy to manufacture.

In the rear zone, the anchor bolt preferably comprises an outer thread, as already mentioned above. This, whilst being easy to manufacture, allows particular efficient force transfer. A nut can be screwed onto the thread.

The invention also includes a method for manufacturing an inventive expansion anchor, wherein the anchor bolt of the expansion anchor is formed using a cross wedge rolling step. Due to its relatively high symmetry, the inventive design can facilitate cross wedge rolling.

Features that are described here in connection with the inventive expansion anchor can also be used in connection with the inventive method and features that are described here in connection with the inventive method can also be used in connection with the inventive expansion anchor.

BRIEF DESCRIPTION OF THE DRAWINGS

The invention is explained in greater detail below with reference to preferred exemplary embodiments, which are depicted schematically in the accompanying drawings, wherein individual features of the exemplary embodiments presented below can be implemented either individually or in any combination within the scope of the present invention.

DETAILED DESCRIPTION

The figures show an embodiment of an inventive expansion anchor. The shown expansion anchor is of the stud type and has an elongate anchor bolt 10 defining a longitudinal axis 99 (see, e.g., FIG. 3), and an expansion shell 30, arranged adjacent to the anchor bolt 10 in a front or tip region of the anchor bolt 10. In the present embodiment, the expansion shell 30 is an expansion sleeve, which surrounds the anchor bolt 10.

Figure 1:
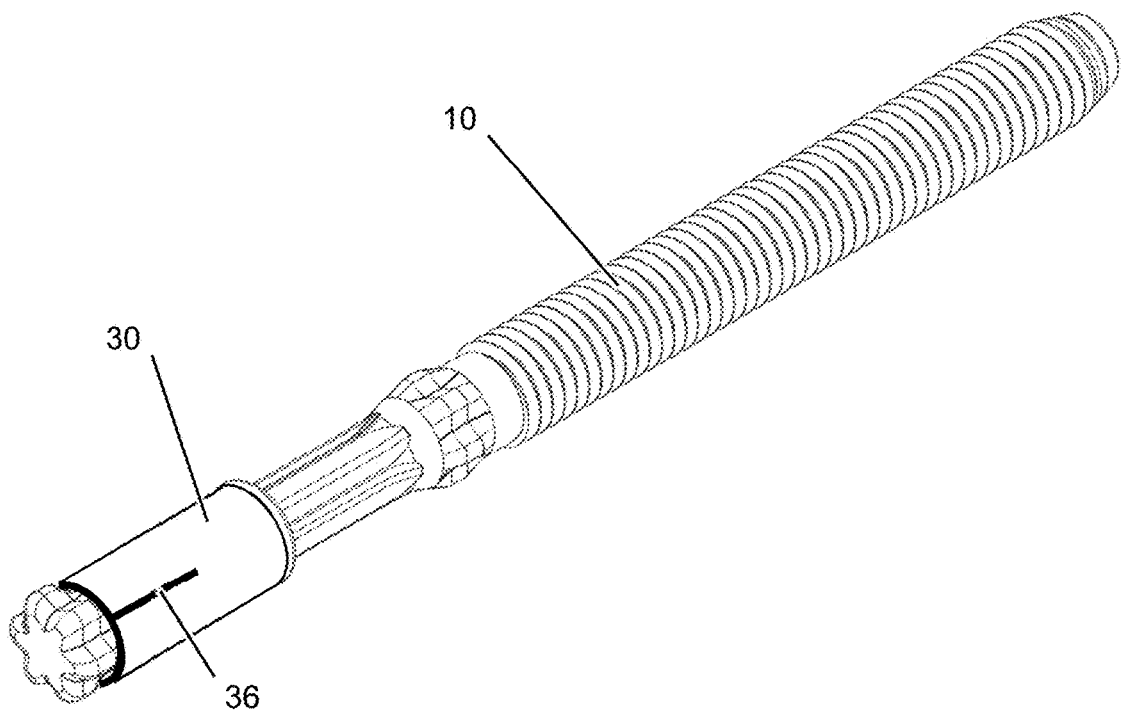
FIG. 1: is a perspective view of an embodiment of an inventive expansion anchor.
Figure 2:
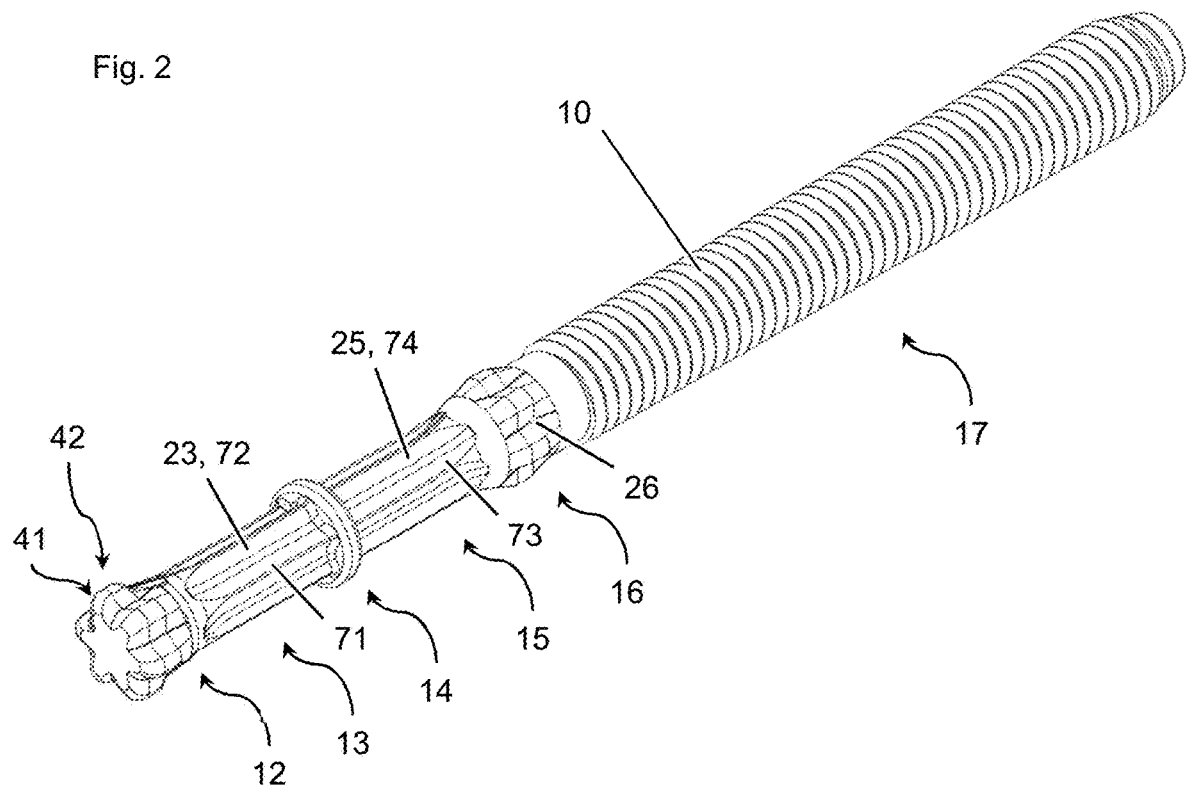
FIG. 2: is a perspective view of the anchor bolt only of the expansion anchor of FIG. 1.
Figure 3:
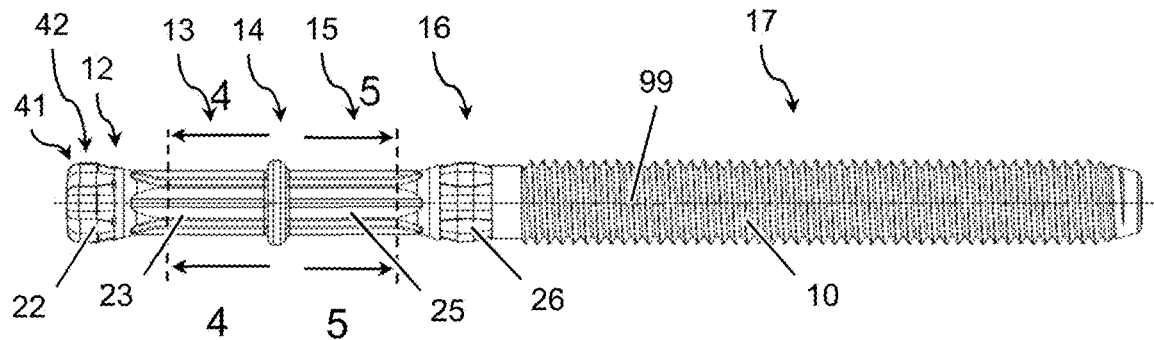
FIG. 3: is a side view of the anchor bolt only of the expansion anchor of FIG. 1, FIG. 4: is a cross-section, 4-4, according to FIG. 3, of the anchor bolt only of the expansion anchor of FIG. 1.

The anchor bolt 10 as shown, e,g, in FIGS. 2 and 3, has, in its front region or tip region, a wedge zone 12 designed for radially expanding the expansion shell 30 when the wedge zone 12 is drawn into the expansion shell 30 in the rearwards direction, i.e. when the expansion shell 30 is moved forwards relative to the wedge zone 12 onto the wedge zone 12. For this purpose, the lateral surface of the anchor bolt 10 converges in the wedge zone 12 towards the rear of the anchor bolt 10, i.e. it converges towards the expansion shell 30, at least before the anchor is installed. Focus of convergence is preferably on the longitudinal axis 99.

In the present example, the anchor bolt 10 also has a transition zone 42, which is located forwards of and adjacent to the wedge zone 12, and a tip zone 41, which is located forwards of and adjacent to the transition zone 42. In the transition zone 42, the rearward convergence is smaller as compared to the wedge zone 12 or the rearward convergence is even zero, but preferably not reverse, i.e. it is not a forward convergence. In the present example, convergence is absent, i.e. zero, in the transition zone 42. In the tip zone 41, the lateral surface of the anchor bolt 10 converges towards the front end of the anchor.

The anchor bolt 10 has a neck zone 13, which is located adjacent to and rearwards of the wedge zone 12. The expansion shell 30 at least partly surrounds this neck zone 13, at least before installation the anchor.

Located at the rearward end of the neck zone 13, the anchor bolt 10 has an abutment zone 14, in which the anchor bolt 10 comprises an abutment ring, radially protruding on the anchor bolt 10 and forming a ring-shape shoulder facing forwards for axially engaging the expansion shell 30 and for advancing the expansion shell 30 forwards.

In the present case, the wedge zone 12 and the neck zone 13 are, by way of example, integral with the rest of the anchor bolt 10. However, a multi-piece design of the anchor bolt 10 is also possible.

In a rear region of the anchor bolt 10, the anchor bolt 10 has a rear zone 17, which is characterized in that the anchor bolt 10 is provided with an outer thread in this rear zone 17.

The outer thread provides a load-introducing structure for introducing rearwardly-directed load into the anchor bolt 10.

Axially between the rear zone 17 and the abutment zone 14, the anchor bolt 10 has an intermediate zone 15, in which the maximum diameter d of the anchor bolt 10 is smaller when compared to the rear zone 17 and/or to the abutment zone 14. The rear zone 17 is adjacent to the abutment zone 14 and could be adjacent to the rear zone 17. However, in the present case, the anchor bolt 10 also has a bulged zone 16, located axially between the intermediate zone 15 and the rear zone 17. The bulged zone 16 is adjacent to the intermediate zone 15 and adjacent to the rear zone 17. The neck zone 13 and the intermediate zone 15 have the same length. The distance of the wedge zone 12 to the abutment zone 14 and the distance of the bulged zone 16 to the abutment zone 14 are the same.

Figure 6:
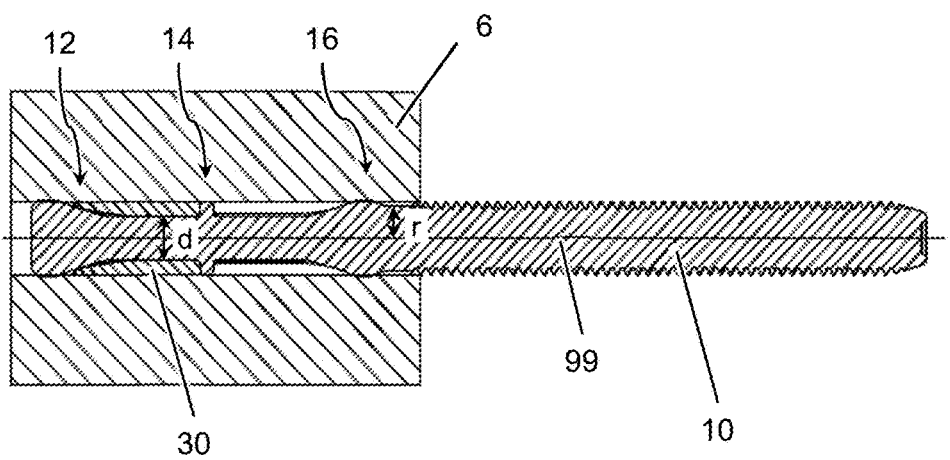
FIG. 6: shows the anchor of FIG. 1, located in a hole in a substrate, in longitudinal sectional view.

As shown in FIG. 6, the anchor bolt 10 has a radius r measured from the longitudinal axis 99 and diameter d. The bulged zone 16 protrudes radially on the anchor bolt 10. In the bulged zone 16, the anchor bolt 10 has a larger maximum radius than in the intermediate zone 15 and in the rear zone 17. Preferably, in the bulged zone 16, the anchor bolt 10 also has a larger maximum diameter than in the intermediate zone 15 and in the rear zone 17. Thus, the bulged zone 16 forms a ring surrounding the longitudinal axis 99, which juts out with respect to its surroundings. The bulged zone 16 can abut on the hole wall when the anchor is radially loaded, allowing force transfer to the substrate and thereby protecting the expansion mechanism provided by the wedge zone 12 and the expansion shell 30.

As can be seen particularly well in FIG. 6, in the bulged zone 16, the anchor bolt 10 preferably has a larger maximum radius, and preferably also a larger diameter, than in the abutment zone 14, and more preferably also a larger maximum radius, and preferably also a larger maximum diameter, than in the wedge zone 12. This leads to particularly good support high up in the hole in the substrate 6. The radius r is measured originating from the longitudinal axis 99 and the diameter d through the longitudinal axis 99 in each case.

The expansion shell 30 is provided with a plurality of slits 36, which originate from the front end of the expansion shell 30 and extend towards the rear end of the expansion shell 30. The slits 36 can facilitate radial expansion of the expansion shell 30.

In the neck zone 13, the anchor bolt 10 is provided, on its lateral surface, with a plurality of neck zone grooves 23. These neck zone grooves 23 are radially accessible from the outside of the anchor bolt 10. The neck zone grooves 23 are longitudinal grooves each, extending parallel to the longitudinal axis 99. In cross-section, the neck zone 13 deviates from a circle at the neck zone grooves 23. The neck zone grooves 23 extend along the entire neck zone 13, into the wedge zone 12. The neck zone 13 is threadless.

Each of the neck zone grooves 23 has a first neck zone groove side wall and a second neck zone groove side wall, wherein these two neck zone groove side walls limit the respective neck zone groove 23 in the circumferential direction. Thus, the neck zone groove side walls are circumferential side walls. In FIG. 2, the first neck zone groove side wall of an exemplary neck zone groove 23 has been marked with reference numeral 71 and the second neck zone groove side wall of this exemplary neck zone groove 23 has been marked with reference numeral 72.

The intermediate zone 15 is threadless. However, in the intermediate zone 15, the anchor bolt 10 is provided, on its lateral surface, with a plurality of intermediate zone grooves 25. These intermediate zone grooves 25 are radially accessible from the outside of the anchor bolt 10. The intermediate zone grooves 25 are longitudinal grooves each, extending parallel to the longitudinal axis 99. In cross-section, the intermediate zone 15 deviates from a circle at the intermediate zone grooves 25. The intermediate zone grooves 25 extend along the entire intermediate zone 15, into the bulged zone 16.

Each of the intermediate zone grooves 25 has a first intermediate zone groove side wall and a second intermediate zone groove side wall, wherein these two intermediate zone groove side walls limit the respective intermediate zone groove 25 in the circumferential direction. Thus, the intermediate zone groove side walls are circumferential side walls. In FIG. 2, the first intermediate zone groove side wall of an exemplary intermediate zone groove 25 has been marked with reference numeral 73 and the second intermediate zone groove side wall of this exemplary intermediate zone groove 25 has been marked with reference numeral 74.

Each of the intermediate zone grooves 25 overlaps one of the neck zone grooves 23 in the radial and circumferential directions. The intermediate zone grooves 25 and the neck zone grooves 23 are aligned, so that the intermediate zone grooves 25 form extensions of the neck zone grooves 23.

The expansion shell 30 engages in the neck zone grooves 23. For this purpose, the expansion shell has axially extending thickenings, which project into the neck zone grooves 23. This engagement can form a rotational lock, which prevents rotating of the expansion shell 30 around the anchor bolt 10.

The bulged zone 16 is provided with bulged zone channels 26, extending longitudinally through the bulged zone 16. The bulged zone channels 26 are surface grooves in the present case. The bulged zone channels 26 allow passage of a fluid medium, for example of a hardenable mortar. Moreover, the bulged zone channels 26 can take up material of the anchor bolt 10, facilitating deformation of the bulged zone 16 and therefore facilitating insertion of the anchor bolt 10 into a hole.

Figure 4:
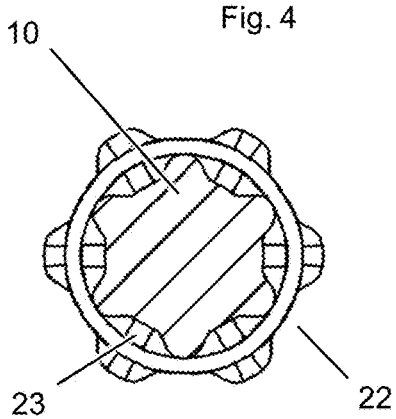
Figure 5:
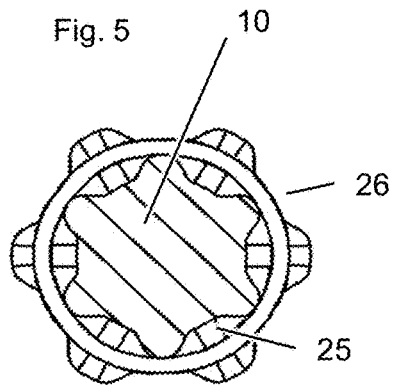
FIG. 5: is a cross-section, 5-5, according to FIG. 3, of the anchor bolt only of the expansion anchor of FIG. 1.

The wedge zone 12, the transition zone 42 and the tip zone 41 are provided with wedge zone channels 22 (see, e.g., FIGS. 3 and 4), each extending longitudinally through the wedge zone 12, the transition zone 42 and the tip zone 41. These wedge zone channels 22 can facilitate manufacturing and/or improve installation and anchorage. The wedge zone channels 22 are aligned with the bulged zone channels 26. Both the wedge zone channels 22 and the bulged zone channels 26 are offset, in the circumferential direction, from both the neck zone grooves 23 and from the intermediate zone grooves 25, as can be seen particularly well in FIGS. 4 and 5.

In its front region, the anchor bolt 10 has a relatively high mirror symmetry: the intermediate zone 15 is, within usual manufacturing tolerances, mirror symmetric to the neck zone 13, and the bulged zone 16 has some symmetric resemblance to the wedge zone 12, all with respect to a mirror plane running perpendicular to the longitudinal axis 99 through the abutment zone 14. Moreover, the wedge zone 12 is provided with longitudinally running surface grooves (namely the wedge zone channels 22), and so is the bulged zone 16 (namely the bulged zone channels 26), and at least parts of the bulged zone 16 have the same axial distance from the abutment zone 14 as at least parts of the wedge zone 12. This high symmetry can give a particular symmetric distribution of forces during a cross wedge rolling manufacturing process.

When the anchor is installed, it is introduced, front end first, into a hole in a substrate 6. Subsequently, the anchor bolt 10, together with its wedge zone 12, is pulled back rearwardly, in particular by tightening a not-shown nut provided on the thread of the rear zone 17 of the anchor bolt 10. As a consequence, the wedge zone 12 is drawn into the front-end region of the expansion shell 30 and the expansion shell 30 is radially displaced, thereby anchoring the expansion anchor. The resulting configuration is shown in FIG. 6. The bulged zone 16 is so dimensioned that it creates an interference fit with the substrate 6 when located in the hole.

What is claimed is:

1. An expansion anchor comprising:
    an anchor bolt; and
    at least one expansion shell located at the anchor bolt;
    the anchor bolt including:
        a wedge zone for expanding the at least one expansion shell;
        a neck zone accommodating at least parts of the expansion shell, the neck zone being located rearwardly of the wedge zone;
        an abutment zone forming a rearward stop for the expansion shell, the abutment zone being located rearwardly of the neck zone; and
        a rear zone for intruding tensile force into the anchor bolt, the rear zone being located rearwardly of the abutment zone;
        at least one forwards groove, located in front of the abutment zone; and
        at least one aligned rearwards groove aligned with the at least one forwards groove, and located rearwardly of the abutment zone.

2. The expansion anchor as recited in claim 1 wherein the at least one forwards groove and the at least one aligned rearwards groove run in a longitudinal direction.

3. The expansion anchor as recited in claim 1 wherein the anchor bolt includes an intermediate zone located rearwardly of the abutment zone, the rear zone being located rearwardly of the intermediate zone, the at least one forwards groove being a neck zone groove located within the neck zone and the at least one aligned rearwards groove being an intermediate zone groove located within the intermediate zone.

4. The expansion anchor as recited in claim 1 wherein located between the abutment zone and the rear zone, and spaced from the abutment zone, the anchor bolt includes a bulged zone radially protruding on the anchor bolt, and the at least one forwards groove is a wedge zone channel located within the wedge zone and the at least one aligned rearwards groove is a bulged zone channel located within the bulged zone.

5. The expansion anchor as recited in claim 1 wherein the at least one forwards groove includes a plurality of forwards grooves, each being located in front of the abutment zone, and at least some of the plurality of forwards grooves have a corresponding aligned rearwards groove of the at least one rearwards groove provided on the anchor bolt, located rearwardly of the abutment zone, and each aligned with a respective one of the plurality of forwards grooves.

6. The expansion anchor as recited in claim 1 wherein, in the abutment zone, the anchor bolt includes an abutment ring radially protruding on the anchor bolt.

7. The expansion anchor as recited in claim 1 wherein the expansion shell is an expansion sleeve surrounding the anchor bolt.

8. The expansion anchor as recited in claim 1 wherein, in the rear zone, the anchor bolt includes an outer thread.

9. A method for manufacturing an expansion anchor as recited in claim 1, the method comprising: forming the anchor bolt using a cross wedge rolling step.

\* \* \* \* \*